United States Patent
Chen

(10) Patent No.: US 11,393,181 B2
(45) Date of Patent: Jul. 19, 2022

(54) IMAGE RECOGNITION SYSTEM AND UPDATING METHOD THEREOF

(71) Applicant: Institute For Information Industry, Taipei (TW)

(72) Inventor: Yan-Hong Chen, Taipei (TW)

(73) Assignee: INSTITUTE FOR INFORMATION INDUSTRY, Taipei (TW)

(*) Notice: Subject to any disclaimer, the term of this patent is extended or adjusted under 35 U.S.C. 154(b) by 54 days.

(21) Appl. No.: 16/698,939

(22) Filed: Nov. 27, 2019

(65) Prior Publication Data

US 2021/0125013 A1 Apr. 29, 2021

(30) Foreign Application Priority Data

Oct. 29, 2019 (TW) ................................ 108139058

(51) Int. Cl.
| | | |
|---|---|---|
| *G06V 20/10* | (2022.01) | |
| *G06V 10/10* | (2022.01) | |
| *G06N 5/04* | (2006.01) | |

(52) U.S. Cl.
CPC ............. *G06V 10/10* (2022.01); *G06N 5/043* (2013.01); *G06V 20/10* (2022.01)

(58) Field of Classification Search
CPC ....... G06K 9/78; G06K 9/00664; G06N 5/043
See application file for complete search history.

(56) References Cited

U.S. PATENT DOCUMENTS

| | | | | |
|---|---|---|---|---|
| 2019/0251349 A1* | 8/2019 | Duerksen | ............... | G06T 7/0002 |
| 2019/0294889 A1* | 9/2019 | Sriram | ................. | G06K 9/6274 |

FOREIGN PATENT DOCUMENTS

| | | | | | |
|---|---|---|---|---|---|
| CN | 103810473 | A | * | 5/2014 | |
| CN | 109859251 | A | * | 6/2019 | ............ G06T 7/248 |
| CN | 109922310 | A | * | 6/2019 | |
| CN | 110070107 | A | * | 7/2019 | |
| CN | 110310387 | A | * | 10/2019 | |
| CN | 110363058 | A | * | 10/2019 | ............ G06T 19/20 |
| EP | 3531392 | A1 | * | 8/2019 | ............ G07B 15/06 |
| TW | 201640419 | A | * | 11/2016 | |
| TW | I564820 | B | | 1/2017 | |

* cited by examiner

*Primary Examiner* — Matthew C Bella
*Assistant Examiner* — Kathleen M Broughton
(74) *Attorney, Agent, or Firm* — Li & Cai Intellectual Property Office

(57) ABSTRACT

An image recognition system includes a cloud server that stores a cloud recognition model and a local server that stores a local recognition model. The local server recognizes an image through the local recognition model to generate a local recognition result. The image corresponds to a field, the image includes at least one object, and the local recognition result includes local category confidence scores of each object corresponding to each of a plurality of categories. For each object, the local server calculates a local entropy indicator according to the field and the corresponding local category confidence scores. The local server determines to transmit the image to the cloud server according to the local entropy indicators of the image. The cloud server recognizes the image through the cloud recognition model to generate a cloud recognition result, and updates the local recognition model according to the cloud recognition result.

17 Claims, 5 Drawing Sheets

IMAGE RECOGNITION SYSTEM AND UPDATING METHOD THEREOF

PRIORITY

This application claims priority to Taiwan Patent Application No. 108139058 filed on Oct. 29, 2019, which is hereby incorporated by reference in its entirety.

FIELD

Embodiments of the present invention relate to an image recognition system and an updating method thereof. More specifically, embodiments of the present invention relate to an image recognition system having an architecture including a cloud server and a local server and an updating method thereof.

BACKGROUND

In the technical field of image recognition of artificial intelligence (AI), object recognition refers to the detection of objects in an image and the category corresponding to each of the objects through a pre-trained image recognition model when the image is received.

During the above object recognition, the field corresponding to an image often affects the category of the object appearing in the image. Taking the recognition of traffic-related objects as an example, if the field corresponding to images obtained by a camera is "Lane in an industrial area," then objects belonging to the category of "Truck" are more likely to appear in the images. If the field corresponding to images obtained by another camera is "Highway," then objects belonging to the category of "Car" or "Automobile" are more likely to appear in the images. If the field corresponding to images obtained by yet another camera is "Sidewalk," then objects belonging to the category of "Pedestrian" are more likely to appear in the images.

In the current image recognition technology, images of various different fields are recognized simply by using a general pre-trained image recognition model. For example, an image recognition model is directly applied to recognize images of various fields after the image recognition model has been trained. In this case, because images in different fields have different characteristics (e.g., object categories that often appear in the images, or background features and noise features of images), the effect or the accuracy of the recognition will be different. Images in some fields are unfavorable for the recognition of the image recognition model (for example, images in the field of "Under an overpass" generally have low brightness, or images in the field of "Intersection of roads" have large light changes), which makes the image recognition model unable to generate highly reliable recognition results when recognizing images in these fields.

Therefore, an urgent need exists in the art to train and update the image recognition model according to different field characteristics so that the updated image recognition model can obtain more accurate recognition results for the images in the field.

SUMMARY

To solve at least the above problems, an embodiment of the present invention provides an image recognition system. The image recognition system may comprise a cloud server and a local server electrically connected with each other. The cloud server may be configured to store a cloud recognition model, and the local server may be configured to store a local recognition model. The local server may recognize an image through the local recognition model to generate a local recognition result, wherein the image corresponds to a field, the image comprises at least one object, and the local recognition result comprises a local category confidence score of each of the at least one object corresponding to each of a plurality of categories. For each of the at least one object, the local server may calculate a local entropy indicator according to the field and the corresponding local category confidence scores. The local server may also determine to transmit the image to the cloud server according to the at least one local entropy indicator of the image. The cloud server may recognize the image through the cloud recognition model after receiving the image to generate a cloud recognition result, and updates the local recognition model according to the cloud recognition result.

To solve at least the above problems, an embodiment of the present invention further provides an updating method for an image recognition system. The updating method for the image recognition system may be adapted for use in the image recognition system, the image recognition system may comprise a cloud server and a local server electrically connected with each other. The cloud server may store a cloud recognition model, and the local server may store a local recognition model. The updating method for the image recognition system may comprise the following steps:
recognizing, by the local server, an image through the local recognition model to generate a local recognition result, wherein the image corresponds to a field, the image comprises at least one object, and the local recognition result comprises a local category confidence score of each of the at least one object corresponding to each of a plurality of categories;
for each of the at least one object, calculating, by the local server, a local entropy indicator according to the field and the corresponding local category confidence scores; and
determining, by the local server, to transmit the image to the cloud server according to the at least one local entropy indicator of the image; and
recognizing, by the cloud server, the image through the cloud recognition model to generate a cloud recognition result, and updating the local recognition model according to the cloud recognition result.

To solve at least the above problems, an embodiment of the present invention further provides a local server. The local server may comprise a storage and a processor electrically connected with each other. The storage may be configured to store a local recognition model. The processor may be configured to recognize an image through the local recognition model to generate a local recognition result, wherein the image corresponds to a field, the image comprises at least one object, and the local recognition result comprises a local category confidence score of each of the at least one object corresponding to each of a plurality of categories. The processor may be configured to, for each of the at least one object, calculate a local entropy indicator according to the field and the corresponding local category confidence scores. The processor may be further configured to determine to transmit the image to a cloud server according to the at least one local entropy indicator of the image so that the cloud server updates the local recognition model according to the image.

In the embodiments of the present invention, both the field information and the local category confidence score of the image are taken in consideration when calculating the local entropy indicator. That is, in addition to determining whether the image should be transmitted to the cloud server according to the local category confidence score, whether the image will be transmitted to the cloud server can also be selected according to the field characteristics for subsequent retraining of the local recognition model. For example, this may enhance recognition of specific categories that often occur in a specific field, or may prevent some noises in the image that often occur in the field from reducing the recognition accuracy.

After the cloud server receives the image, identifies the image through the cloud recognition model for the image to generate a cloud recognition result, and updates the local recognition model according to the cloud recognition result, the updated local recognition model can obtain a more accurate recognition result for the image in the field, because the field information and the local category confidence score of an image have been taken into consideration in the selection of the image.

In addition, the embodiment of the present invention can also achieve the automation of screening images for retraining the local recognition model because it determines whether to transmit the images to the cloud server according to the calculated local entropy indicator. That is, the present invention can automatically determine how to update the local recognition model so that the updated local recognition model can obtain a more accurate recognition result for the image in the field.

What described above is not intended to limit the present invention, but merely outlines the technical problems that the present invention can solve, the technical means that can be adopted and the technical effects that can be achieved so that a person having ordinary skill in the art can preliminarily understand the present invention. According to the attached drawings and the description of the following embodiments, a person having ordinary skill in the art can further understand the details of various embodiments of the present invention.

DETAILED DESCRIPTION

Figure 1:
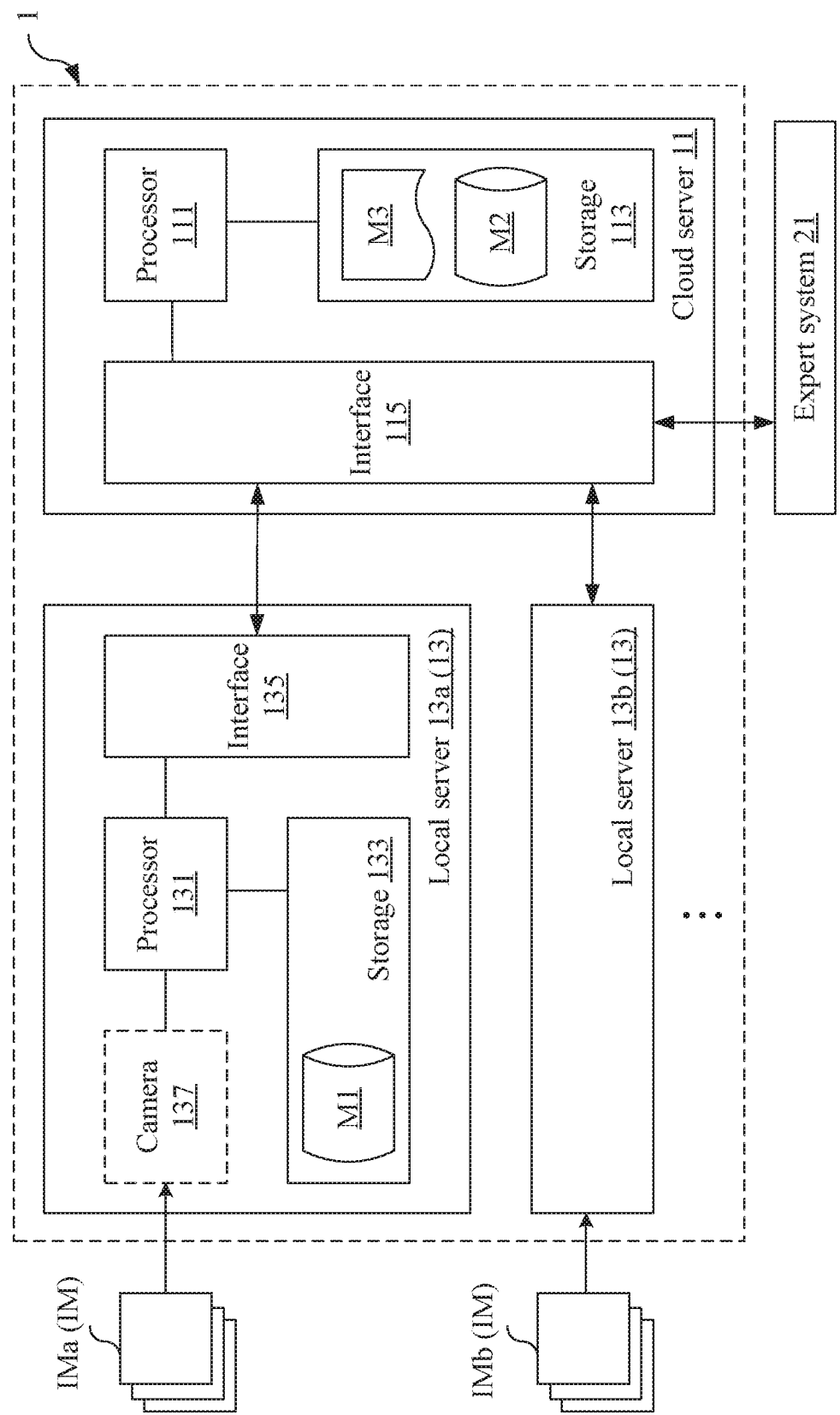
FIG. 1 illustrates a schematic view of an image recognition system according to some embodiments.

In the following description, the present invention will be explained with reference to certain example embodiments thereof. However, these example embodiments are not intended to limit the present invention to be implemented in the operations, environment, applications, structures, processes, examples, embodiments or steps described in these example embodiments. In the attached drawings, elements unrelated to the present invention are omitted from depiction but may be implied in the drawings; and dimensions of elements and proportional relationships among individual elements in the attached drawings are only exemplary examples but not intended to limit the present invention.

Unless stated particularly, same (or similar) element symbols may correspond to same (or similar) elements in the following description. Unless stated particularly, the number of each element described hereinafter may be one or more while being implementable.

Terms used in the present disclosure are only for the purpose of describing embodiments and are not intended to limit the invention. Singular forms "a," "an," and "the" are intended to include the plural forms as well, unless the context clearly indicates otherwise. Terms such as "comprises" and/or "comprising" specify the presence of stated features, integers, steps, operations, elements, and/or components, but do not preclude the presence of one or more other features, integers, steps, operations, elements, components, and/or combinations thereof. The term "and/or" includes any and all combinations of one or more associated listed items.

FIG. 1 illustrates a schematic view of an image recognition system according to some embodiments. The content shown in FIG. 1 is only for the purpose of illustrating an embodiment of the present invention and is not intended to limit the present invention. Referring to FIG. 1, an image recognition system 1 may basically comprise a cloud server 11 and at least one local server 13 electrically connected to each other. The cloud server 11 may basically comprise a processor 111, a storage 113, and an interface 115 electrically connected to each other (by direct electrical connection or indirect electrical connection). The local server 13 may also be referred to as an edge end server, which may basically comprise a processor 131, a storage 133, and an interface 135 electrically connected to each other (by direct electrical connection or indirect electrical connection).

Each of the processor 111 of the cloud server 11 and the processor 131 of the local server 13 may be any of various microprocessors or microcontrollers capable of signal processing. The microprocessor or the microcontroller is a kind of programmable specific integrated circuit that is capable of operating, storing, outputting/inputting or the like. Moreover, the microprocessor or the microcontroller can receive and process various coded instructions, thereby performing various logical operations and arithmetical operations and outputting corresponding operation results. The processor 111 may be programmed to interpret various instructions so as to process data in the cloud server 11 and execute various operations or programs. The processor 131 may be programmed to interpret various instructions to process data in the local server 13 and execute various operations or programs.

Each of the storage 113 of the cloud server 11 and the storage 133 of the local server 13 may comprise various storage units included a general computer device/computer. Each of the storage 113 and the storage 133 may comprise a primary memory (which is also called a main memory or internal memory) which is usually called for short as a memory, and the memory at this level is in direct communication with a central processing unit. The central processing unit may read instruction sets stored in the memory, and execute these instruction sets if needed. Each of the storage 113 and the storage 133 may further comprise a secondary memory (which is also called an external memory or auxiliary memory), and the secondary memory does not directly communicate with the central processing unit, and is connected to the central processing unit through an I/O channel of the memory and uses a data buffer to transmit data to the primary memory. Data in the secondary memory will not disappear (i.e., being non-volatile) even with no power supply. The secondary memory may for example be various types of hard disks, optical disks or the like. Each of the storage 113 and the storage 133 may also comprise a third-level storage device, i.e., a storage device that can be inserted into or pulled out from a computer directly, e.g., a mobile disk. The storage 113 of the cloud server 11 may be configured to store a cloud recognition model M3 and a mirror recognition model M2, and the processor 111 may execute the cloud recognition model M3 and the mirror recognition model M2 to perform various image recognition procedures. The storage 133 of the local server 13 may be configured to store a pre-trained local recognition model M1, and the processor 131 can execute the local recognition model M1 to perform various image recognition procedures.

Generally speaking, in the image recognition system 1, the processor 111 of the cloud server 11 may have a higher computing capability, while the storage 113 thereof may have a higher storing capability, and the local server 13 is usually only provided with basic computing and storing capabilities in order to reduce cost. Therefore, as compared to the local server 13, the cloud server 11 may store more models or models occupying larger space of the memory and may perform more complex or more numerous operations. For example, the cloud server 11 can store not only the cloud recognition model M3 which occupies larger space of the memory, but also a mirror recognition model M2 for each local server 13. Moreover, the cloud server 11 not only can execute the recognition model described above, but also can train or update the various models described above. In contrast, the local server 13 usually only executes the pre-trained local recognition model M1 to recognize images and performs various operations with lower complexity. What described above is only for the purpose of illustrating the present invention, and is not intended to be limiting.

Each of the interface 115 of the cloud server 11 and the interface 135 of the local server 13 may comprise various communication interfaces, which are for example but not limited to an Ethernet communication interface, an Internet communication interface or the like, to be connected to each other or connected to other devices or systems (e.g., an expert system 21) to transmit various messages, data, or instructions to each other. Each of the interface 115 and the interface 135 may also comprise various input/output elements provided in a general computer device/computer for receiving data from the outside and outputting data to the outside. Each of the interface 115 and the interface 135 may comprise for example a mouse, a trackball, a touch pad, a keyboard, a scanner, a microphone, a user interface, a screen, a touch screen, a projector or the like, without being limited thereto. In some embodiments, each of the interface 115 and the interface 135 may comprise a human-machine interface (e.g., a graphical user interface) to facilitate users to interact with the cloud server 11 and the local server 13 respectively.

In some embodiments, the local server 13 may further comprise a camera 137, and the camera 137 may be electrically connected (by direct electrical connection or indirect electrical connection) to the processor 131. In some embodiments, the camera 137 may also have a wired connector and/or a wireless connector to connect with the local server 13 in a wired or wireless way. The camera 137 may be various devices with functions of dynamically capturing images and/or statically capturing images, which are for example but not limited to digital cameras, video recorders, or various mobile devices with photographing functions. The camera 137 may be configured to capture an image IM.

In some embodiments, generally speaking, the local server 13 may receive the image IM, and the processor 131 thereof may recognize the image IM through the local recognition model M1 and determine whether to transmit the image IM to the cloud server 11 so that the cloud server 11 updates the local recognition model according to the image IM. Next, how the local server 13 and the cloud server 11 perform the above operations will be explained through FIG. 2A and FIG. 2B.

Figure 2A:
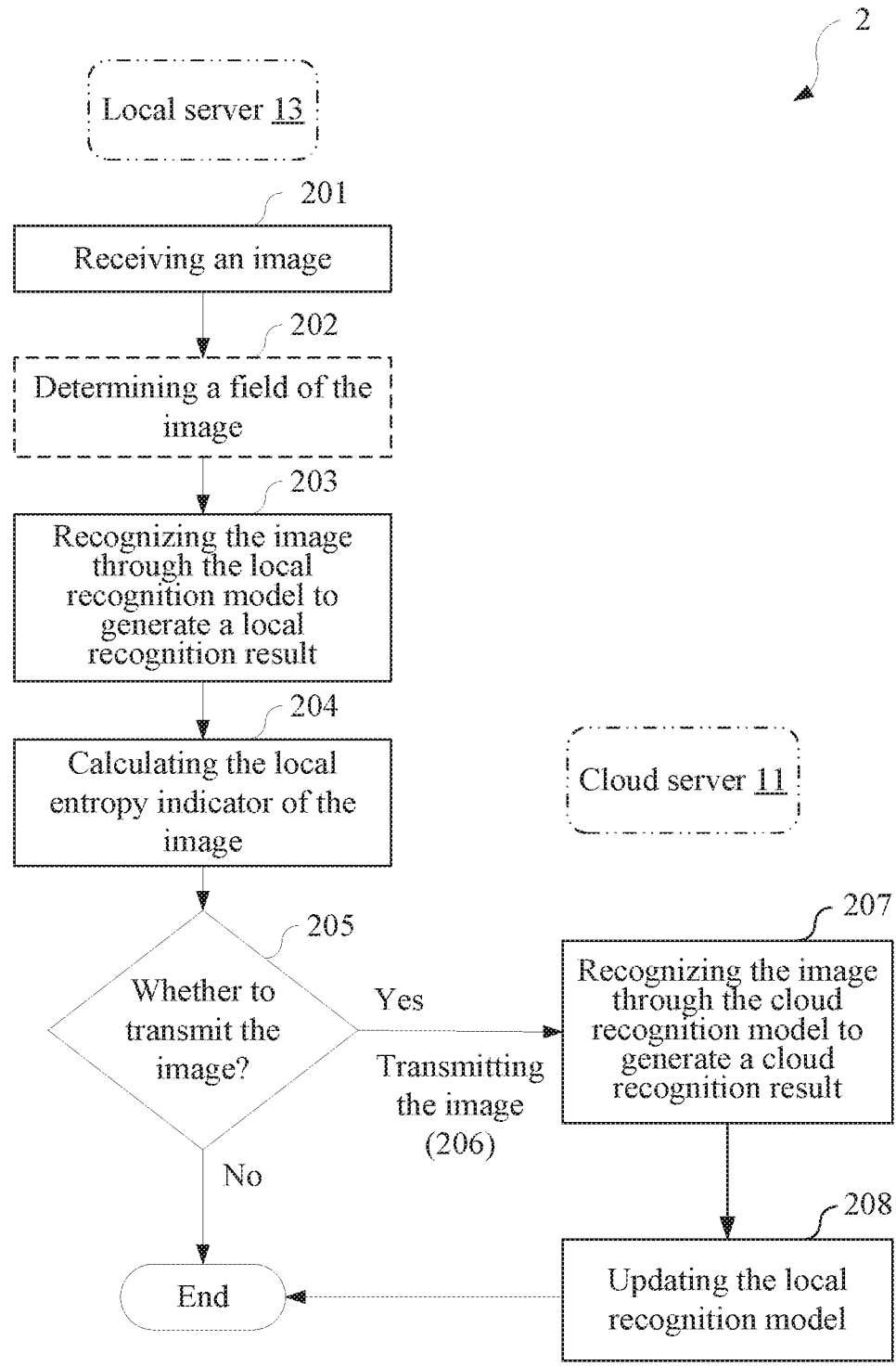
FIG. 2A to FIG. 2B are schematic views illustrating the way in which an image recognition system according to some embodiments is updated.
Figure 2B:
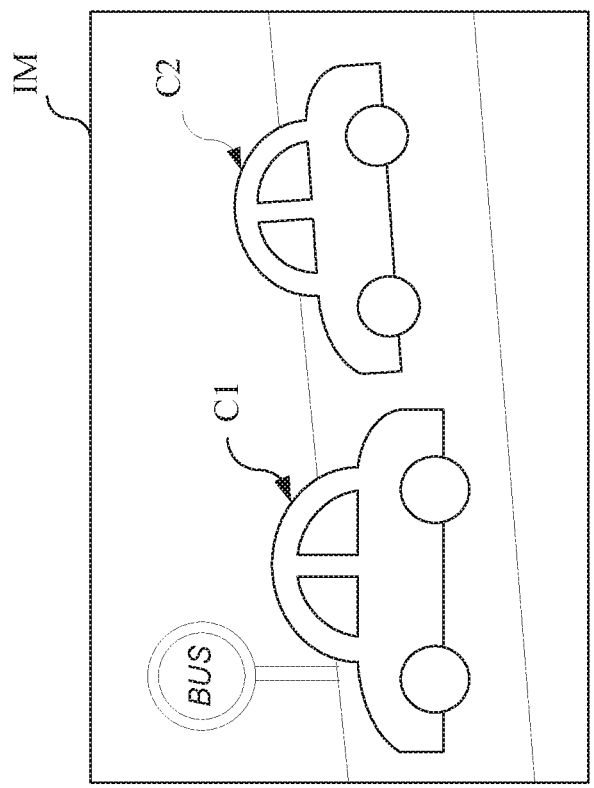

FIG. 2A and FIG. 2B are schematic views illustrating a process 2 regarding how the image recognition system 1 according to some embodiments determines to update the local recognition model M1. Contents shown in FIG. 2A and FIG. 2B are only for the purpose of illustrating embodiments of the present invention, and are not intended to limit the present invention.

Referring to FIG. 1 and FIG. 2A, the local server 13 may receive an image IM (which is labeled as action 201). It shall be noted that in some embodiments, as shown in FIG. 1, the camera 137 is provided inside the local server 1, and the local server 13 may capture the image IM to be recognized via the camera 137. In some other embodiments, if the local server 13 itself does not have a camera, then images captured by other external photographing devices or images provided by various other external electronic devices or users can be received through the interface 135 for image recognition.

Each image IM received by the local server 13 corresponds to a field. Optionally, after the local server 13 receives the image IM, the local server 13 may determine a field corresponding to the image IM according to at least one piece of image information of the image IM (which is labeled as action 202). For example, the local server 13 may determine the field of the image IM according to GPS positioning information of the image IM, IP position information of the image IM, or field data of the image IM provided by the user. The local server 13 may also execute various image recognition algorithms to recognize the field according to features in the image IM.

After receiving the image IM, the local server 13 may recognize the image IM through the local recognition model M1 to generate a local recognition result (which is labeled as action 203). In detail, the local server 13 may input the image IM into the local recognition model M1 to generate a category local recognition result of the image IM. The local recognition result may comprise a local category confidence score of at least one object appearing in the image IM corresponding to each of a plurality of categories.

In some embodiments, the local recognition model M1 is pre-trained and stored in the local server 13. It shall be noted that, the local recognition model M1 may be various algorithms or programs with image recognition functions currently available, which are for example but not limited to: a you only live once (YOLO) model and a Single Shot Multibox Detector (SSD) model based on a Mobilenet architecture. The local recognition model M1 has the capability to generate a category recognition result for objects in the detected image, that is, to generate a local category confidence score of each detected object corresponding to each of a plurality of categories. The local category confidence score may be a value between zero and one, and the higher the value of the local category confidence score of the object corresponding to a certain category is, the higher the confidence level that the object belongs to the category will be.

It is assumed in the following description that the categories of objects recognizable by the pre-trained local recognition model M1 include three categories: "Car," "Large car," and "Pedestrian." That is, the local recognition model M1 may generate local category confidence scores respectively corresponding to the three categories for each detected object. Next, referring to the example provided in FIG. 2B, it is assumed that the field corresponding to the image IM is a "Busway," and the image IM actually comprises an object C1 and an object C2. In this case, after the local server 13 inputs the image IM into the local recognition model M1, the local recognition model M1 may detect the two objects and generate the local category confidence scores respectively corresponding to the three categories ("Car," "Large car," and "Pedestrian") for the objects C1 and C2, and the local category confidence scores are as follows.

TABLE 1

| Object | Category | | |
| --- | --- | --- | --- |
| | Car | Large car | Pedestrian |
| Object C1 | 0.92 | 0.07 | 0.01 |
| Object C2 | 0.80 | 0.15 | 0.05 |

As shown in Table 1, the local category confidence score that the object C1 belongs to the category "Car" is "0.92," the local category confidence score that the object C1 belongs to the category "Large car" is "0.07," and the local category confidence score that the object C1 belongs to the category "Pedestrian" is "0.01." The local category confidence score that the object C2 belongs to the category "Car" is "0.8," the local category confidence score that the object C2 belongs to the category "Large car" is "0.15," and the local category confidence score that the object C2 belongs to the category "Pedestrian" is "0.05."

It shall be noted that, the sequence of the actions 202 and 203 in FIG. 2A is not limited. In some embodiments, only the action 203 may be performed; in some embodiments, the action 202 may be performed first; in some embodiments, the action 203 may be performed first; and in some embodiments, the actions 202 and 203 may be performed simultaneously.

Next, the local server 13 may calculate the local entropy indicator of the image IM according to the corresponding field and the corresponding local category confidence scores for each of the at least one object in the image IM (which is labeled as action 204). At least one local entropy indicator of the image IM may be used as a reference indicator for the local server 13 to determine whether to transmit the image IM to the cloud server 11. Generally speaking, the higher the local entropy indicator corresponding to an object of the image IM is, the more inaccurate the recognition result of the local recognition model M1 for the object will be (for example, the local category confidence score is lower). Thus, the image IM needs to be transmitted to the cloud server 11 for more accurate recognition, and the local recognition model M1 is updated accordingly.

First, based on the field, each of the plurality of categories corresponds to a field category parameter. For example, the field category parameters corresponding to the three categories of this embodiment according to different fields may be preset as follows:

TABLE 2

| Field | Category | | |
| --- | --- | --- | --- |
| | Car | Big car | Pedestrian |
| Sidewalk | 1 | 1 | 8 |
| Highway | 4 | 1 | 4 |
| Busway | 2 | 4 | 4 |

Referring to the correspondence table shown in table 2, since the field corresponding to the image IM is a "Busway," the field category parameters corresponding to the categories "Car," "Large car," and "Pedestrian" are "2," "4," and "4" respectively. In some embodiments, the field category parameter corresponding to each category may be set according to different requirements. For example, if the user wishes to strengthen the recognition of categories "Car" and "Pedestrian" in the field "Busway," then higher field category parameters may be set for the categories "Car" and "Pedestrian."

Next, the local server 13 may perform the following operation for each object to calculate a local entropy indicator: for each of the plurality of categories, calculating a product of the corresponding field category parameter, the local category confidence score, and a logarithm of the local category confidence score, and calculating a negative value of a sum of the plurality of products to obtain the local entropy indicator. The above operation may be expressed as the following formula:

$$S_L = -\Sigma_i k_i P_{L\_i} \log P_{L\_i} \quad \text{(Formula 1)}$$

In detail, according to the formula 1, the local server 13 calculates a local entropy indicator $S_L$ for each object in the image IM. In the above formula, i is the category number, $k_i$ is the field category parameter corresponding to the category i, and $P_{L\_i}$ is the local category confidence score corresponding to the category i for the object. Here, the category number i of the category "Car" is "1," the category number i of the category "Large car" is "2," and the category number i of the category "Pedestrian" is "3."

In this embodiment, the local server 13 first calculates the local entropy indicator $S_L$ of the object C1 as follows:

$$S_L = -[2*0.92*\log(0.92) + 4*0.07*\log(0.07) + 4*0.01*\log(0.01)] \approx 0.4700$$

Next, the local server 13 calculates the local entropy indicator $S_L$ of the object C2 as follows:

$$S_L = -[2*0.80*\log(0.80) + 4*0.15*\log(0.15) + 4*0.05*\log(0.05)] \approx 0.9096$$

After the calculation of the local entropy indicator $S_L$ of the object C1 and the object C2 is completed respectively, the local server 13 may determine whether to transmit the image IM to the cloud server 11 according to the aforesaid local entropy indicators of the image IM (which is labeled as action 205). In some embodiments, the local server 13 may determine whether any of the aforesaid local entropy indicators is greater than a first threshold value, and if any of the aforesaid local entropy indicators is greater than the first threshold value, the local server 13 determines to execute action 206, i.e., to transmit the image IM to the cloud server 11. The first threshold value may be various values. In this embodiment, the first threshold value is set to be "0.5." Since the local entropy indicator $S_L$ "0.9096" of the object C2 is greater than the first threshold value "0.5," which meets the condition that "the local entropy indicator $S_L$ of any object is greater than the first threshold value," the local server 13 determines to transmit the image IM to the cloud server 11. In other embodiments, the local server 13 may determine whether to perform the action 206 according to other conditions.

In some embodiments, if the local server 13 determines that the above condition is not met, then the process 2 may be directly ended. At this time, the local server 13 may also directly store the local recognition result to the storage 133 or output the local recognition result through the interface 135.

If the local server 13 determines to execute the action 206, then the cloud server 11, after receiving the image IM, may recognize the image IM through the cloud recognition model M3 to generate a cloud recognition result (which is labeled as action 207). In some embodiments, the cloud recognition model M3 may be pre-trained and stored in the cloud server 11, or may be trained and generated by the processor 111 of the cloud server 11 itself. It shall be noted that, the cloud recognition model M3 may be various algorithms or programs with image recognition functions currently available, which are for example but not limited to: Regions with CNN (R-CNN) models, RetinaNet models or the like. The cloud recognition model M3 has the capability to generate category recognition results of objects in the detected image IM. Similar to the local recognition model M1, the cloud recognition model M3 may also generate cloud category confidence scores corresponding to a plurality of categories for each detected object, and the cloud category confidence score may also be a value between zero and one. The higher the value of the cloud category confidence score corresponding to a certain category of the object is, the higher the confidence level that the object belongs to that category will be. The difference is that the accuracy of the recognition result generated by the cloud recognition model M3 for the image IM is generally higher than that of the local recognition model M1. Therefore, the recognition result generated by the cloud recognition model M3 may be used as the basis for updating the local recognition model M1.

Similarly, the categories of objects recognizable by the cloud recognition model M3 also include three categories: "Car," "Large car," and "Pedestrian." That is, the cloud recognition model M3 may also generate cloud category confidence scores respectively corresponding to the three categories for each detected object. In this case, after the cloud server 11 inputs the image IM into the cloud recognition model M3, the cloud recognition model M3 may detect the two objects and generate the cloud category confidence scores respectively corresponding to the three categories ("Car," "Large car," and "Pedestrian") for the objects C1 and C2, and the cloud category confidence scores are as follows.

TABLE 3

| Object | Category | | |
|---|---|---|---|
| | Car | Large car | Pedestrian |
| Object C1 | 0.95 | 0.05 | 0.05 |
| Object C2 | 0.97 | 0.02 | 0.01 |

As shown in Table 3, the cloud category confidence score that the object C1 belongs to the category "Car" is "0.95," the cloud category confidence score that the object C1 belongs to the category "Large car" is "0.05," and the cloud category confidence score that the object C1 belongs to the category "Pedestrian" is "0.05." The cloud category confidence score that the object C2 belongs to the category "Car" is "0.97," the cloud category confidence score that the object C2 belongs to the category "Large car" is "0.02," and the cloud category confidence score that the object C2 belongs to the category "Pedestrian" is "0.01."

Next, the cloud server 11 may update the local recognition model according to the cloud recognition result described above (which is labeled as action 208). In detail, in the action 208, the storage 113 of the cloud server 11 may store a mirror recognition model M2 identical to the local recognition model M1. The cloud server 11 may retrain and update the image recognition model M2 according to the cloud recognition result. That is, after marking the cloud recognition result to the image IM, the re-marked image IM is used as training data to retrain and update the mirror recognition model M2. Next, the updated mirror recognition model M2 is deployed to the local server 13. That is, the updated mirror recognition model M2 is used to replace the local recognition model in the local server 13 to update the local recognition model M1, and the process 2 is ended.

In some other embodiments, optionally, when the local server 13 determines that the above condition is met during the execution of the action 205, various methods may be selected to obtain a more accurate recognition result (not shown) so that the cloud server 11 updates the local recognition model M1 accordingly. For example, the local server 13 may directly transmit the image IM to the expert system 21 or other computer devices to obtain expert recognition results provided by the expert system 21 or the other computer devices. In some embodiments, the expert system 21 may be various computer devices, which may include an expert recognition model (not shown) with higher accuracy than the local recognition model M1 to automatically generate an expert recognition result. In some embodiments, the expert system 21 may generate expert recognition results via personnel judgment. As another example, the local server 13 can directly receive the personnel judgment result of judging the image IM by personnel through the interface 135. For another example, the local server 13 may transmit the image IM to the cloud server 11, and then the cloud server 11 directly receives the personnel judgment result of judging the image IM by personnel through the interface 115.

Figure 3:
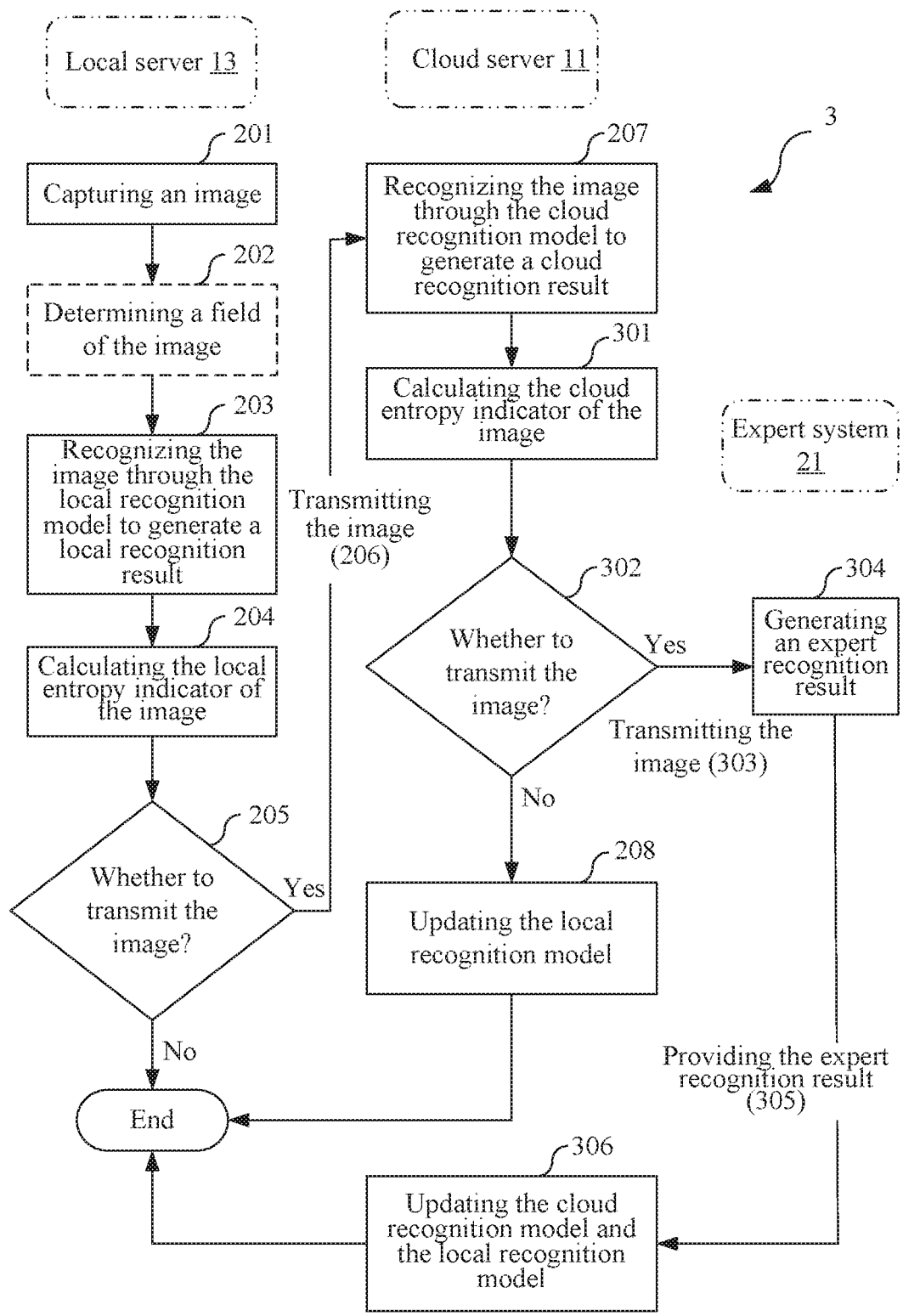
FIG. 3 is a schematic view illustrating the way in which an image recognition system according to some embodiments updates the system.

As described above, FIG. 2A illustrates some embodiments in which the image recognition system 1 updates the local recognition model M1. Next, other embodiments in which the image recognition system 1 also updates the cloud recognition model M3 will be explained through FIG. 3. FIG. 3 is a schematic view illustrating a process 3 in which the image recognition system 1 according to some embodiments updates the local recognition model M1 and the cloud recognition model M3. The content shown in FIG. 3 is only for the purpose of illustrating an embodiment of the present invention and is not intended to limit the present invention.

Referring to FIG. 3, the process 3 may comprise actions 201 to 208 as in the process 2. Details of implementation of parts of the process 3 similar to that of the process 2 (i.e., actions 201 to 208) will not be further described herein. It shall be noted that, the process 3 differs from the process 2 in that: the process 3 may selectively further perform actions 301 to 306 after completing the action 207 to determine whether to further update the cloud recognition model M3. As shown in FIG. 3, after the cloud server 11 has completed the action 207 (i.e., after calculating the above cloud recognition result), the cloud sever 11 may further calculate the cloud entropy indicator of the image IM according to the corresponding cloud category confidence scores for each of the at least one object in the image IM (which is labeled as action 301). At least one cloud entropy indicator of the image IM may be used as a reference indicator for the cloud server 13 to determine whether to transmit the image IM to the expert system 21. Generally speaking, the higher the cloud entropy indicator corresponding to an object of the image IM is, the more inaccurate the recognition result of the cloud recognition model M3 for the object will be (for example, the cloud category confidence score is lower). Thus, the image IM needs to be transmitted to the expert system 21 for more accurate recognition, and the cloud recognition model M3 is updated accordingly.

In the action 301, the cloud server 11 may perform the following operation to calculate the cloud entropy indicator: for each of the plurality of categories, calculating a product of the corresponding cloud category confidence score, and a logarithm of the cloud category confidence score, and calculating a negative value of a sum of the plurality of products to obtain the cloud entropy indicator. The above operation may be expressed as the following formula:

$$S_C = -\Sigma_i P_{C\_i} \log P_{C\_i} \quad \text{(Formula 2)}$$

In detail, according to the formula 2, the cloud server 11 calculates a cloud entropy indicator $S_C$ for each object in the image IM. In the above formula, i is the category number, and $P_{C\_i}$ is the cloud category confidence score corresponding to the category i for the object. Here, similarly, the category number i of the category "Car" is "1," the category number i of the category "Large car" is "2," and the category number i of the category "Pedestrian" is "3."

In this embodiment, the cloud server 11 first calculates the cloud entropy indicator $S_C$ of the object C1 as follows:

$$S_C = -[0.95*\log(0.95) + 0.05*\log(0.05) + 0.05*\log(0.05)] \cong 0.1513$$

Next, the cloud server 11 calculates the cloud entropy indicator $S_C$ of the object C2 as follows:

$$S_C = -[0.97*\log(0.97) + 0.02*\log(0.02) + 0.01*\log(0.01)] \cong 0.0668.$$

After the calculation of the cloud entropy indicator $S_C$ of the object C1 and the object C2 is completed respectively, the cloud server 11 may determine whether to transmit the image IM to an expert system 21 according to the aforesaid cloud entropy indicators of the image IM (which is labeled as action 302). In some embodiments, the cloud server 11 may determine whether any of the aforesaid cloud entropy indicators is greater than a second threshold value, and if any of the aforesaid cloud entropy indicators is greater than the second threshold value, the cloud server 11 determines to execute action 303, i.e., to transmit the image IM to the expert system 21. The second threshold value may be various values. In this embodiment, the second threshold value is set to be "0.5." Because the cloud entropy indicators $S_C$ "0.1513" and "0.0668" of the object C1 and the object C2 are all not greater than the second threshold value "0.5," the condition that "the cloud entropy indicator $S_C$ of any object is greater than the second threshold value" is not met, and thus the cloud server 11 determines to take the cloud recognition results as the recognition results of the image IM, and does not transmit the image IM to the cloud server 11 and enters the action 208. In other embodiments, the cloud server 11 may determine whether to perform the action 303 according to other conditions.

If the cloud server 11 determines that the above conditions are met, then the cloud server 11 may execute action 303 to transmit the image IM to the expert system 21, and the expert system 21 recognizes the image IM to generate an expert recognition result (which is labeled as action 304) and provide the expert recognition result to the cloud server 11 (which is labeled as action 305). In detail, in some embodiments, the expert system 21 may be various computer devices, which may include an expert recognition model (not shown) with higher accuracy than the cloud recognition model M3 to automatically generate expert recognition results. In some embodiments, the expert system 21 may generate expert recognition results via personnel judgment. In some other embodiments, if the cloud server 11 determines that the above conditions are met, the cloud server 11 may also directly receive the expert recognition result generated from human judgment through the interface 115.

Next, the cloud server 11 may update the cloud recognition model M3 and the local recognition model M1 according to the above expert recognition results (which is labeled as action 306). In detail, the cloud server 11 may retrain and update the cloud recognition model M3 and the mirror recognition model M2 according to the expert recognition result. In detail, after marking the expert recognition result to the image IM, the cloud server 11 may take the re-marked image IM as training data to retrain the cloud recognition model M3 so as to update the cloud recognition model M3 and the mirror recognition model M2. Then, the cloud server 11 deploys the updated mirror recognition model M2 to the local server 13 (i.e., uses the updated mirror recognition model M2 to replace the local recognition model currently available in the local server 13) to update the local recognition model M1, and the process 3 is ended.

Regarding the operation of the above image recognition system 1, the cloud server 11 may be simultaneously connected to a plurality of local servers 13. For example, as shown in FIG. 1, the cloud server 11 may be connected to the local servers 13a, 13b, . . . simultaneously, the local server 13a may be configured to receive an image IMa and determine whether to transmit the image IMa to the cloud server 11, the local server 13b may be configured to receive an image IMb and determine whether to transmit the image IMb to the cloud server 11, and so on. It shall be noted that, the embodiment of the present invention is described herein through the operation of the cloud server 11 and a single local server 13. The operation of the cloud server 11 and a plurality of local servers 13 shall be appreciated by a person having ordinary skill in the art according to the description herein.

It shall be noted that, regarding the case where a local server 13 transmits the image IM to the cloud server 11, the cloud server 11 may receive a plurality of images transmitted by the local server 13 within a time interval, respectively recognize the images, and then update the local recognition model M1 using a plurality of generated recognition results together. In addition, regarding the case where at least one local server 13 transmits a plurality of images to the cloud server 11, in some embodiments, the cloud server 11 may receive a plurality of images transmitted by at least one local server 13 within a time interval, and then determine which of the plurality of images will be used to update the cloud recognition model M3 according to the cloud entropy indicator $S_C$ of each of the plurality of images.

It shall be noted that, since whether the local server 13 transmits the image to the cloud server 11 is determined according to the calculated local entropy indicator, and whether the cloud server 11 transmits the image IM to the expert system 21 is determined according to the calculated cloud entropy indicator, the embodiment of the present invention can achieve the effect of automatically screening the image IM for retraining the local recognition model and the cloud recognition model. That is, the present invention can automatically determine how to update the local recognition model M1 and the cloud recognition model M3 so that the updated local recognition model M1 can obtain a more accurate recognition result for the image IM in the field and the updated cloud recognition model M3 can also obtain a more accurate recognition result for various images IM.

Figure 4:
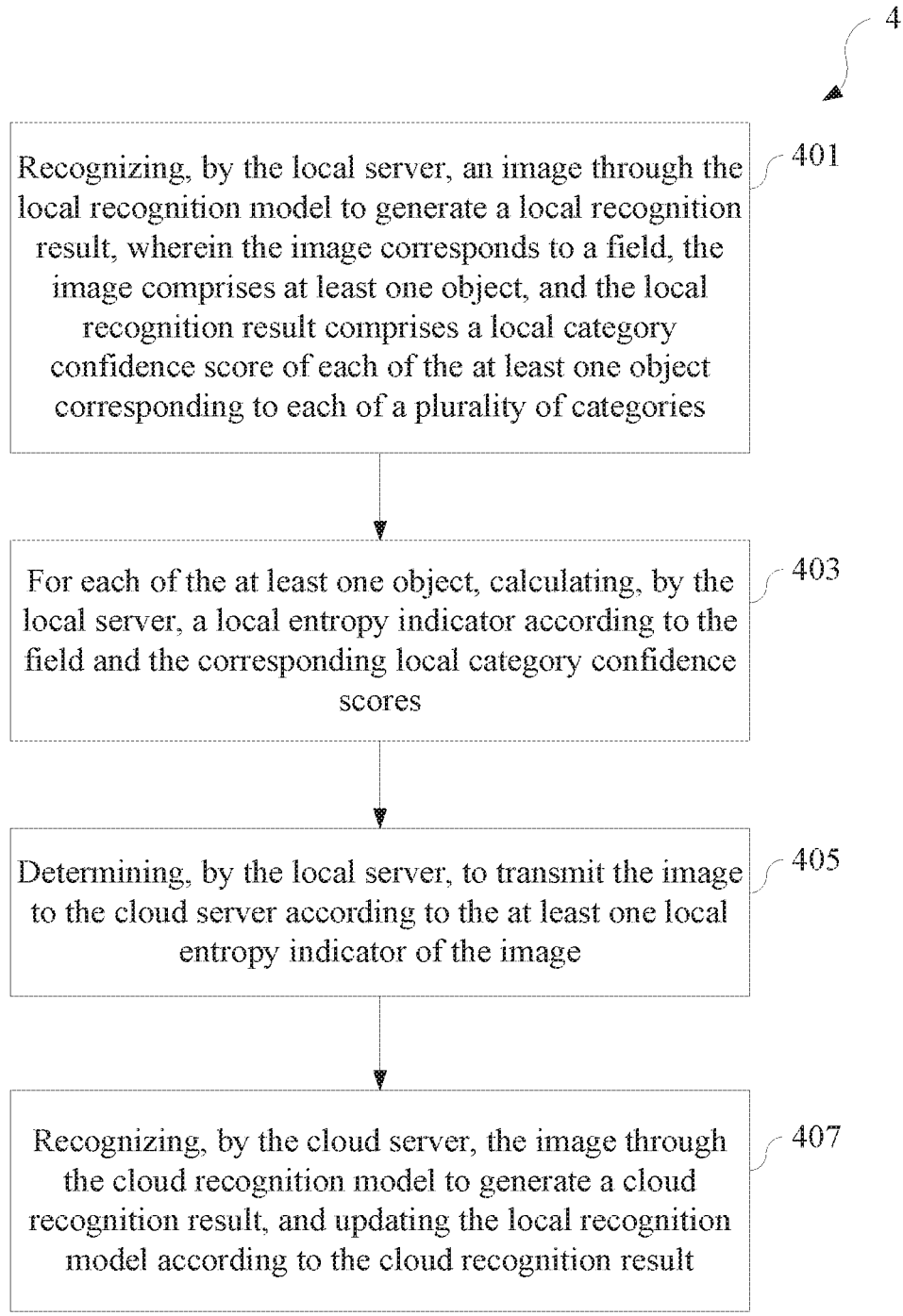
FIG. 4 illustrates a schematic view of an updating method for the image recognition system of FIG. 1 according to some embodiments.

FIG. 4 illustrates a schematic view of an updating method for the image recognition system of FIG. 1 according to some embodiments. The content shown in FIG. 4 is only for the purpose of illustrating an embodiment of the present invention and is not intended to limit the present invention.

Referring to FIG. 4, an updating method 4 for an image recognition system may be adapted for use in the image recognition system, the image recognition system may comprise a cloud server and a local server electrically connected with each other, the cloud server stores a cloud recognition model, the local server stores a local recognition model, and the updating method 4 for the image recognition system comprises the following steps: recognizing, by the local server, an image through the local recognition model to generate a local recognition result, wherein the image corresponds to a field, the image comprises at least one object, and the local recognition result comprises a local category confidence score of each of the at least one object corresponding to each of a plurality of categories (which is labeled as step 401); for each of the at least one object, calculating, by the local server, a local entropy indicator according to the field and the corresponding local category confidence scores (which is labeled as step 403); determining, by the local server, to transmit the image to the cloud server according to the at least one local entropy indicator of the image (which is labeled as step 405); and recognizing, by the cloud server, the image through the cloud recognition model to generate a cloud recognition result, and updating the local recognition model according to the cloud recognition result (which is labeled as step 407).

The sequence of the steps 401 to 407 shown in FIG. 4 is not limited. The sequence of the steps 401 to 407 shown in FIG. 4 may be adjusted while the updating method 4 for the image recognition system can still be implemented.

In some embodiments, the local server is further configured to capture the image through a camera, and the updating method 4 for the image recognition system may further comprise the following step: determining, by the local server, the field corresponding to the image according to at least one piece of image information of the image.

In some embodiments, the local server may determine to transmit the image to the cloud server when the local server determines that any of the at least one local entropy indicator is greater than a first threshold value.

In some embodiments, based on the field, each of the plurality of categories may correspond to a field category parameter, and for each of the at least one object, the local server may execute the following step to calculate the local entropy indicator: for each of the plurality of categories, calculating a product of the corresponding field category parameter, the local category confidence score, and a logarithm of the local category confidence score, and calculating a negative value of a sum of the plurality of products to obtain the local entropy indicator.

In some embodiments, the cloud server may further store a mirror recognition model identical to the local recognition model, and the updating method 4 for the image recognition system may further comprise the following step: retraining, by the cloud server, the mirror recognition model by using the cloud recognition result to update the mirror recognition model, and deploying the updated mirror recognition model to the local server to update the local recognition model.

In some embodiments, the cloud recognition result may comprise a cloud category confidence score of each of the at least one object corresponding to each of the plurality of categories, and the updating method 4 may further comprise the following steps: for each of the at least one object, calculating, by the cloud server, a cloud entropy indicator according to the plurality of corresponding cloud category confidence scores; and determining, by the cloud server, to transmit the image to an expert system according to the at least one cloud entropy indicator of the image, and updating the cloud recognition model and the local recognition model according to an expert recognition result provided by the expert system.

In some embodiments, the cloud recognition result may comprise a cloud category confidence score of each of the at least one object corresponding to each of the plurality of categories, and the updating method 4 for the image recognition system may further comprise the following steps: for each of the at least one object, calculating, by the cloud server, a cloud entropy indicator according to the plurality of corresponding cloud category confidence scores; and determining, by the cloud server, to transmit the image to an expert system according to the at least one cloud entropy indicator of the image, and updating the cloud recognition model and the local recognition model according to an expert recognition result provided by the expert system. Moreover, the cloud server determines to transmit the image to the expert system when the cloud server may determine that any of the at least one cloud entropy indicator is greater than a second threshold value.

In some embodiments, the cloud recognition result may comprise a cloud category confidence score of each of the at least one object corresponding to each of the plurality of categories, and the updating method 4 for the image recognition system may further comprise the following steps: for each of the at least one object, calculating a cloud entropy indicator by the cloud server according to the plurality of corresponding cloud category confidence scores; and determining, by the cloud server, to transmit the image to an expert system according to the at least one cloud entropy indicator of the image, and updating the cloud recognition model and the local recognition model according to an expert recognition result provided by the expert system. Moreover, the cloud server executes the following step to calculate the cloud entropy indicator: for each of the plurality categories, calculating a product of the corresponding cloud category confidence score and a logarithm of the cloud category confidence score, and calculating a negative value of a sum of the plurality of products to obtain the cloud entropy indicator.

In some embodiments, all the above steps of the updating method 4 for the image recognition system may be executed by the image recognition system 1. In addition to the above steps, the updating method 4 for the image recognition system may also comprise other steps corresponding to all the above embodiments of the image recognition system 1. These other steps shall be appreciated by a person having ordinary skill in the art based on the above description of the image recognition system 1, and thus will not be further described herein.

The above disclosure is related to the detailed technical contents and inventive features thereof for some embodiments of the present invention, but such disclosure is not to limit the present invention. A person having ordinary skill in the art may proceed with a variety of modifications and replacements based on the disclosures and suggestions of the invention as described without departing from the characteristics thereof. Nevertheless, although such modifications and replacements are not fully disclosed in the above descriptions, they have substantially been covered in the following claims as appended.

What is claimed is:

1. An image recognition system, comprising:
   a cloud server, being configured to store a cloud recognition model; and
   a local server, being electrically connected to the cloud server, and being configured to:
   store a local recognition model;
   recognize an image through the local recognition model to generate a local recognition result, wherein the image corresponds to a field, the image comprises at least one object, and the local recognition result comprises a local category confidence score of each of the at least one object corresponding to each of a plurality of categories;
   for each of the at least one object, calculate a local entropy indicator according to the field and the corresponding local category confidence scores; and
   determine whether to transmit the image to the cloud server according to the at least one local entropy indicator of the image;
   wherein the cloud server recognizes the image through the cloud recognition model after receiving the image to generate a cloud recognition result, and updates the local recognition model according to the cloud recognition result,
   wherein based on the field, each of the plurality of categories corresponds to a field category parameter, and for each of the at least one object, the local server performs the following operation to calculate the local entropy indicator:
   for each of the plurality of categories, calculating a product of the corresponding field category parameter, the local category confidence score, and a logarithm of the local category confidence score, and calculating a negative value of a sum of the plurality of products to obtain the local entropy indicator.

2. The image recognition system of claim 1, wherein the local server is further configured to capture the image through a camera, and the local server is further configured to determine the field corresponding to the image according to at least one piece of image information of the image.

3. The image recognition system of claim 1, wherein the local server determines to transmit the image to the cloud server when the local server determines that any of the at least one local entropy indicator is greater than a first threshold value.

4. The image recognition system of claim 1, wherein:
   the cloud server is further configured to store a mirror recognition model identical to the local recognition model; and
   the cloud server retrains the mirror recognition model by using the cloud recognition result to update the mirror recognition model, and deploys the updated mirror recognition model to the local server to update the local recognition model.

5. The image recognition system of claim 1, wherein the cloud recognition result comprises a cloud category confidence score of each of the at least one object corresponding to each of the plurality of categories, and the cloud server is further configured to:
   for each of the at least one object, calculate a cloud entropy indicator according to the plurality of corresponding cloud category confidence scores; and
   determine to transmit the image to an expert system according to the at least one cloud entropy indicator of the image, and update the cloud recognition model and the local recognition model according to an expert recognition result provided by the expert system.

6. The image recognition system of claim 5, wherein the cloud server determines to transmit the image to the expert system when the cloud server determines that any of the at least one cloud entropy indicator is greater than a second threshold value.

7. The image recognition system of claim 5, wherein the cloud server performs the following operation to calculate the cloud entropy indicator:
   for each of the plurality categories, calculating a product of the corresponding cloud category confidence score and a logarithm of the cloud category confidence score, and calculating a negative value of a sum of the plurality of products to obtain the cloud entropy indicator.

8. An updating method for an image recognition system, being adapted for use in the image recognition system, the image recognition system comprising a cloud server and a local server electrically connected with each other, the cloud server storing a cloud recognition model, the local server storing a local recognition model, the updating method for the image recognition system comprising:
   recognizing, by the local server, an image through the local recognition model to generate a local recognition result, wherein the image corresponds to a field, the image comprises at least one object, and the local recognition result comprises a local category confidence score of each of the at least one object corresponding to each of a plurality of categories;
   for each of the at least one object, calculating, by the local server, a local entropy indicator according to the field and the corresponding local category confidence scores;
   determining, by the local server, whether to transmit the image to the cloud server according to the at least one local entropy indicator of the image; and
   recognizing, by the cloud server, the image through the cloud recognition model to generate a cloud recognition result, and updating the local recognition model according to the cloud recognition result,
   wherein based on the field, each of the plurality of categories corresponds to a field category parameter, and for each of the at least one object, the local server executes the following step to calculate the local entropy indicator:
   for each of the plurality of categories, calculating a product of the corresponding field category parameter, the local category confidence score, and a logarithm of the local category confidence score, and calculating a negative value of a sum of the plurality of products to obtain the local entropy indicator.

9. The updating method for the image recognition system of claim 8, wherein the local server is further configured to capture the image through a camera, and the updating method for the image recognition system further comprises:
   determining, by the local server, the field corresponding to the image according to at least one piece of image information of the image.

10. The updating method for the image recognition system of claim 8, wherein the local server determines to transmit the image to the cloud server when the local server determines that any of the at least one local entropy indicator is greater than a first threshold value.

11. The updating method for the image recognition system of claim 8, wherein the cloud server is further configured to store a mirror recognition model identical to the local recognition model, and the updating method for the image recognition system further comprises:

retraining, by the cloud server, the mirror recognition model by using the cloud recognition result to update the mirror recognition model, and deploying the updated mirror recognition model to the local server to update the local recognition model.

12. The updating method for the image recognition system of claim 8, wherein the cloud recognition result comprises a cloud category confidence score of each of the at least one object corresponding to each of the plurality of categories, and the updating method for the image recognition system further comprises:

for each of the at least one object, calculating, by the cloud server, a cloud entropy indicator according to the plurality of corresponding cloud category confidence scores; and determining, by the cloud server, to transmit the image to an expert system according to the at least one cloud entropy indicator of the image, and updating the cloud recognition model and the local recognition model according to an expert recognition result provided by the expert system.

13. The updating method for the image recognition system of claim 12, wherein the cloud server determines to transmit the image to the expert system when the cloud server determines that any of the at least one cloud entropy indicator is greater than a second threshold value.

14. The updating method for the image recognition system of claim 12, wherein the cloud server executes the following step to calculate the cloud entropy indicator:

for each of the plurality categories, calculating a product of the corresponding cloud category confidence score and a logarithm of the cloud category confidence score, and calculating a negative value of a sum of the plurality of products to obtain the cloud entropy indicator.

15. A local server, comprising:

a storage, being configured to store a local recognition model; and a processor, being electrically connected to the storage, and being configured to:

recognize an image through the local recognition model to generate a local recognition result, wherein the image corresponds to a field, the image comprises at least one object, and the local recognition result comprises a local category confidence score of each of the at least one object corresponding to each of a plurality of categories;

for each of the at least one object, calculate a local entropy indicator according to the field and the corresponding local category confidence scores; and determine whether to transmit the image to a cloud server according to the at least one local entropy indicator of the image so that the cloud server updates the local recognition model according to the image, wherein based on the field, each of the plurality of categories corresponds to a field category parameter, and for each of the at least one object, the processor performs the following operation to calculate the local entropy indicator:

for each of the plurality of categories, calculating a product of the corresponding field category parameter, the local category confidence score, and a logarithm of the local category confidence score, and calculating a negative value of a sum of the plurality of products to obtain the local entropy indicator.

16. The local server of claim 15, further comprising a camera that is electrically connected to the processor and configured to obtain the image, wherein the processor is further configured to determine the field corresponding to the image according to at least one piece of image information of the image.

17. The local server of claim 15, wherein the processor determines to transmit the image to the cloud server when the processor determines that any of the at least one local entropy indicator is greater than a first threshold value.

* * * * *